United States Patent Office 3,443,058
Patented May 6, 1969

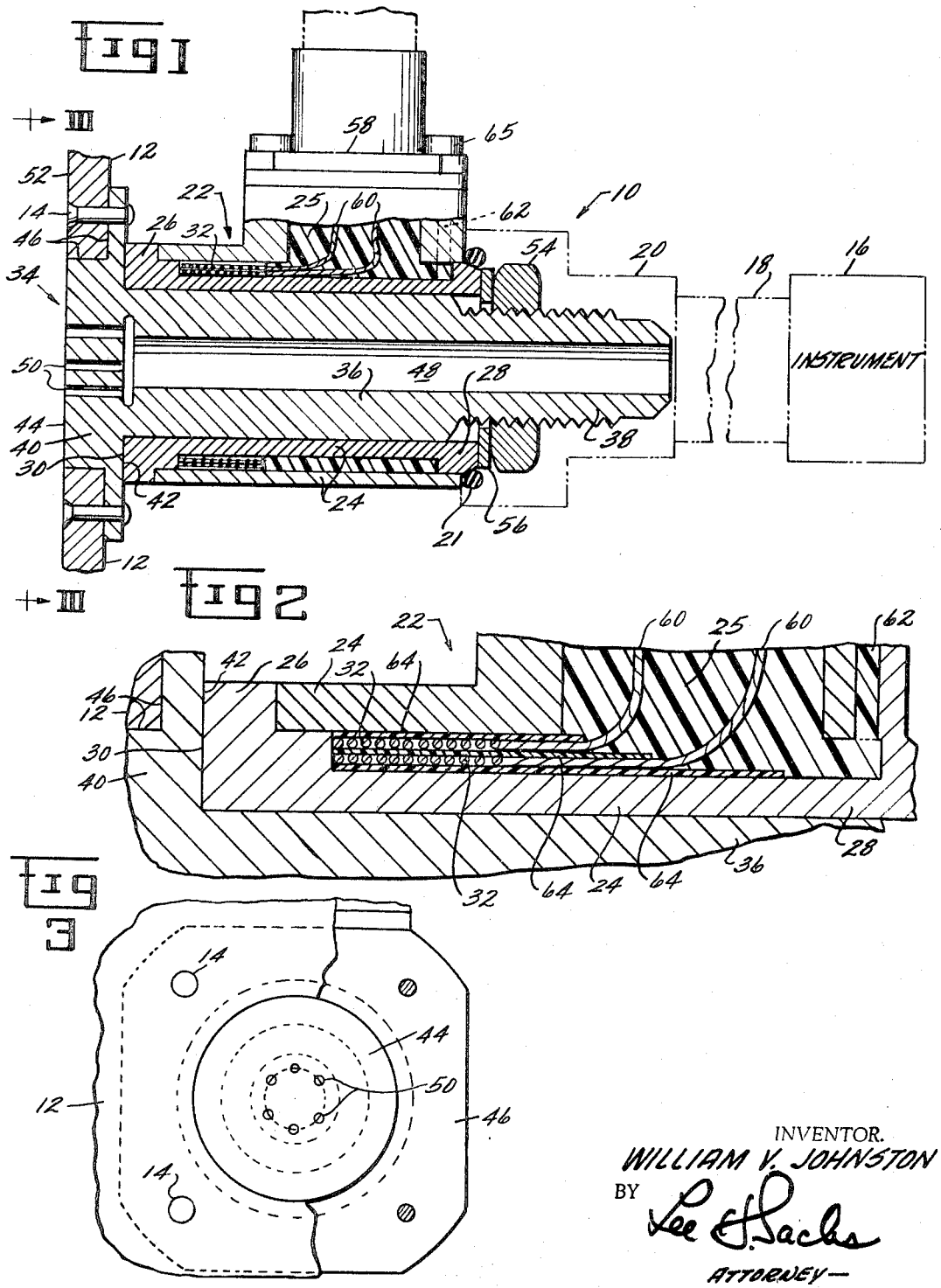

3,443,058
HEATED STATIC PORT APPARATUS
William V. Johnston, Mercer Island, Wash., assignor to General Electric Company, a corporation of New York
Filed June 5, 1967, Ser. No. 643,536
Int. Cl. H05b 1/00, 3/10
U.S. Cl. 219—201
2 Claims

ABSTRACT OF THE DISCLOSURE

Apparatus for mounting on the skin of an aircraft through which air is free to pass between the outside of the aircraft and an air pressure measuring instrument within the aircraft. A removable and replaceable heater element is pressed against a portion of the apparatus which contacts both the aircraft skin and the ambient air in order to prevent the formation of ice which would block the transmission of air pressure to the instrument.

---

One group of instruments included in a large number of aircraft are devices to sense air pressure outside of an aircraft. Pressure is frequently sensed at a number of different points for different uses. Some points at which pressure measurements are made are spaced from the aircraft skin such as with pilot tube type projections. Other measurements, however, are required to be taken at the aircraft skin, desirably at points on the skin across which the flow of air has little, if any, pressure effect. Pressure sensed at the aircraft skin area then can be used for such purposes as the determination of aircraft altitude, to feed information to an automatic pilot and to adjust cabin pressure.

Apparatus mounted through and flush with the skin of an aircraft and terminating in a blind end at an instrument is sometimes referred to as a static port assembly. Such an assembly will not function properly, however, if ice forms on the opening during low temperature operation. Icing can be prevented through the application of heat to the port openings, for example using resistance heating elements in the static port structure. In the past, heating units were integral with the remainder of the static port assembly. Therefore when a heating element no longer functioned, the static port assembly, generally attached by rivets to the aircraft skin, had to be removed such as by grinding away the rivet heads and the unit replaced. The new static port assembly and the aircraft skin was then resurfaced to an aerodynamic smooth finish. Repeated removal of the rivet heads, which for aerodynamic reasons were of the countersunk type, followed by resurfacing, resulted in a thinned skin area which ultimately had to be removed and replaced.

It is a principal object of the present invention to provide an improved, heated static port apparatus including a heater which provides good heat transfer for anti-icing yet can be removed and replaced without disturbing the attachment of the static port assembly to the aircraft skin.

Another object is to provide such an assembly having an electric heater which can be positioned to place its electrical connector at any point in a circle about the axis of the assembly.

Still another object is to provide such an assembly which requires only a single coupling in the air passage through the aircraft skin to the pressure sensing instrument.

These and other objects and advantages will be more fully understood from the following detailed description, drawing and examples all of which are meant to be typical of rather than any limitation on the scope of the present invention.

In the drawing:

FIG. 1 is a partially sectional, partially diagrammatic view of the improved heated static port apparatus of the present invention in assembly with the supporting structure and a connecting conduit;

FIG. 2 is a fragmentary partially sectional enlarged view of a portion of FIG. 1 particularly showing the heater chamber; and FIG. 3 is partially sectional view of the apparatus of FIG. 1 in tthe direction of arrows III—III.

Briefly, the heated static port apparatus of the present invention comprises a port fitting which is adapted to receive a hollow heater member. The port fitting carries a means to press a surface of the heater member against the port fitting to provide improved heat transfer between the heater member and the port fitting. A feature of the heater member is heating means in a heater chamber within the heating member, the heating means being potted in a dielectric mixture including about 30–70 weight percent of a powder refractory oxide to provide insulation resistance as well as good thermal conductivity. The heating means is held in the potting material in a substantially voltage-free matrix. Also provided on the port fitting is a connector end portion projecting through the heater member to provide a means to connect with a conduit.

Referring to FIGS. 1 and 2, the heated static port apparatus of the present invention is shown generally at 10. The apparatus is connected at one end to a supporting structure 12, such as an aircraft skin, by rivets 14. At the other end the apparatus is connected to a pressure sensing instrument 16 through a conduit 18 and single fluid sealing coupling 20 all of which are shown in phantom.

Apparatus 10 includes a hollow heater member 22 having a heater body 24, a heater head 26 secured with the heater body and a heater foot 28, all to enclose a heater cavity 25. The heater head 26 has a primary heat transfer face 30. A passage extends through the heater member from the head through the foot. A heating means 32, shown in more detail in FIG. 2 and described in more detail later, is located in the heater cavity 25 and surrounds the heater body 24 at the heaater head end of the heater cavity to provide heat to the heater head 26.

Apparatus 10 also includes a port fitting 34 having a fitting body 36 with a connector end portion 38. A fitting head 40, which is secured with fitting body 36, has an internal head face 42, an external head face 44 and an intermediate head face 46 extending between the internal and external head faces and shaped to receive an apparatus supporting member such as aircraft skin 12.

Fitting body 36 includes a body air passage 48 open through the connector end portion 38. Air passage 48 communicates with a head air passage or passages 50 to define a continuous port fitting air passage through the entire fitting. The head air passage 50 can comprise one or a number of openings through head 40 in any desired configuration. One such configuration is shown in FIG. 3.

In order that head face 44 present no aerodynamic resistance to the flow of air across external supporting member surface 52 of aircraft skin 12, the head face 44 is shaped to conform substantially with the contour of surface 52. Similarly, rivets 14 are generally of the countersunk head type.

The static port apparatus includes a means such as nut 54, carried by fitting body 36, and cooperating with a threaded portion of connector end portion 38 of body 36 to allow pressure to be applied to foot 28 of heater body 24. Such pressure is applied to face primary heat transfer face 30 of heater head 26 against internal face 42 of port fitting head 40 to place faces 30 and 42 under compression. These faces then provide an improved heat transfer path from heater head 26 to port fitting head 40. Heat then will pass preferentially and primarily across those faces rather than across other adjacent surfaces between the heater member and the port fitting member of the apparatus of the present invention. A washer 56 can be placed between nut 54 and heater foot 28 to prevent turning of heater member 22 when that nut is tightened.

Heating member 22 includes electrical connector means such as electrical plug 58 through which electrical conductors such as wires 60 pass to connect heating means or elements 32 to a source of electrical power. The power input and the size and number of heating elements 32 can be varied or specified to provide a desired amount of heat for fitting head 40. However, because heater member 22 is releasably or slidably disposed about fitting body 36, plug 58 can be positioned at any desired point in a circle about the fitting body. This has been seen to be a distinct advantage in the use of the apparatus of the present invention for a variety of aircraft configurations. Also, the positioning of plug 58 is independent of the position or direction of conduit 18 and instrument 16, thus providing added flexibility Heating elements 32, located in heater cavity 25, are selected for size and material to deliver the desired heat at operating voltages. For example, Nichrome alloy wires are used in sizes between number 30 and number 40 with 115 volts. Such heating elements perferably are coated with a cured polymeric type dielectric normally applied to heating wires to avoid turn-to-turn contact. Also, the layers of heating elements 32 of heating member 22, as shown in more detail in FIG. 2, are separated one from the other and from the shell of the heater member 22 by layers of dielectric insulation 64. In a preferred form such a layer of insulation 64 is as wrapped strips of polytetrafluoroethylene, one type of which is commercially available as Teflon material. In addition, the heating elements and layers of dielectric insulation are impregnated or "potted" in a sufficiently temperature resistant polymeric material, for example, an epoxy plastic, loaded or mixed with about 30–70 weight percent refractory oxide powder, preferably electrically fused alumina power. This mixture occupies cavity 25.

Typical of some thermal degradation tests performed on an epoxy potting resin showed that when loaded with 50 weight percent powdered $Al_2O_3$, the degradation temperature of the mixture was increased from about 450° F. to at least 700° F. The tests were stopped at 700° F. although no degradation was noted at that point. Below about 30 weight percent alumina there was an insufficient improvement in heat transfer coefficient. Above about 70 weight percent alumina, there was too high a resistance to flow to allow proper impregnation and filling by the epoxy-alumina mixture of heater cavity 25 within heater member 22.

Such impregnation and filling of the heater cavity 25 was accomplished after winding of alternate layers of heating elements 32 and dielectric insulation 64 as shown in FIG. 2. The cavity 25 was first evacuated, for example to about 25–30″ Hg, then the alumina-epoxy resin mixture was injected under pressure such as 15–20 p.s.i.g. The injection can be made with a standard commercially available potting gun directed through an opening such as hole 62 in heating member 22. Hole 62 is later prepared to receive a bolt 65 which cooperates to secure plug 58 to the heating member. After impregnation, the resin can be cured by holding at room temperature for about 24–48 hours and then heating at about 250° F. for about 1 hour.

Resulting from this type of impregnation is a heating member 22 the heating elements 32 of which are potted in electrical isolation one from the other in a substantially void-free matrix which is a dielectric material yet has good thermal conductivity.

As was mentioned before, only a single connection is required between the port fitting air passage and conduit 18. Thus any points of possible air leakage from the outside of the aircraft to conduit 18 are reduced to one. Fluid sealing coupling 20, for example including an O ring 21, can be of the widely used and commercially available air sealing Standard AND type air or hydraulic fitting.

Although the present invention has been described in connection with specific embodiments and examples, it will be understood by those skilled in the arts involved the variations and modifications of which the present invention is capable. It is intended in the appended claims to cover all such variations and modifications.

What is claimed is:

1. An improved heated static port apparatus static port apparatus comprising:
    (A) a hollow heater member including
        (1) a heater body;
        (2) a heater head secured with the heater body and having a primary heat transfer face;
        (3) a heater foot;
        (4) the heater body, head and foot enclosing a heater chamber;
        (5) a passage through the heater member through both the heater and the heater foot; and
        (6) heating means in the heater chamber to provide heat to the heater head;
        (7) the heater chamber including a mixture of a dielectric polymeric material and about 30–70 weight percent of a powdered refractory oxide to fill the portion of the heater chamber carrying the heating means to a substantially void-free condition;
    (B) a port fitting including
        (1) a fitting body having
            (a) a connector end portion, and
            (b) a body air passage open through the connector end portion
        (2) a fitting head secured with the fitting body and having
            (a) an internal head face
            (b) an external head face
            (c) an intermediate head face extending between the internal and external head faces and shaped to receive an apparatus supporting member
            (d) the external head face being shaped to conform substantially with an external support member surface
            (e) the fitting head including a head air passage therethrough from the external face and communicating with the body air passage to provide a continuous port fitting air passage through the fitting head and body and open only through the connector end portion and the fitting head,
        (3) the fitting body being releasably disposed within the passage through the heater member
        (4) substantially all of the heater primary heat transfer face being in heat transfer relationship with the internal head face
        (5) the connector end portion of the fitting body projecting from the passage through the heater member at the heater foot (C) means carried by the port fitting to press the primary heat transfer face of the heater head against the internal head face to place such faces under compression and (D) means on the fitting body connector end portion to cooperate with an air conduit connector.

2. The apparatus of claim 1 in which the heating means in the heater chamber surrounds the heater body adjacent the heater head; and the powdered refractory oxide in the mixture with the dielectric polymeric material is a powdered alumina.

References Cited
UNITED STATES PATENTS

| 2,482,701 | 9/1949 | Anderson | 73—212 |
| 2,510,986 | 6/1950 | Larkin | 73—212 |

RICHARD M. WOOD, *Primary Examiner.*

C. L. ALBRITTON, *Assistant Examiner.*

U.S. Cl. X.R.

73—212

UNITED STATES PATENT OFFICE
CERTIFICATE OF CORRECTION

Patent No. 3,443,058                                May 6, 1969

William V. Johnston

It is certified that error appears in the above identified patent and that said Letters Patent are hereby corrected as shown below:

Column 4, line 38, after "heater", first occurrence, insert -- head --.

Signed and sealed this 14th day of April 1970.

(SEAL)
Attest:

Edward M. Fletcher, Jr.                        WILLIAM E. SCHUYLER, JR.
Attesting Officer                                  Commissioner of Patents